United States Patent [19]

Göttel

[11] 4,195,662
[45] Apr. 1, 1980

[54] ELECTROMAGNETIC VALVE WITH ELECTRIC SIGNAL GENERATOR

[75] Inventor: Otto Göttel, Ingelfingen, Fed. Rep. of Germany

[73] Assignee: Bürkert GmbH, Ingelfingen, Fed. Rep. of Germany

[21] Appl. No.: 773,455

[22] Filed: Mar. 2, 1977

[30] Foreign Application Priority Data

Mar. 3, 1976 [DE] Fed. Rep. of Germany ... 7606375[U]

[51] Int. Cl.² ............................................. F16K 37/00
[52] U.S. Cl. ........................................ 137/554; 137/556;
251/129; 251/138; 116/202; 116/204; 116/277
[58] Field of Search ............... 137/553, 554, 556, 356;
251/129, 138, 143; 116/202, 204, 277

[56] References Cited

U.S. PATENT DOCUMENTS

| | | | |
|---|---|---|---|
| 862,551 | 8/1907 | Gardner | 137/554 |
| 1,734,258 | 11/1929 | Kraft et al. | 251/129 |
| 1,781,453 | 11/1930 | Frame | 251/129 |
| 2,295,097 | 9/1942 | Waugh | 251/129 |
| 2,353,765 | 7/1944 | Mathisen | 251/297 |
| 2,496,638 | 2/1950 | Ray | 137/553 |
| 2,509,504 | 5/1950 | Jensen | 137/554 |
| 2,528,898 | 11/1950 | McIlvaine | 137/554 |
| 2,633,868 | 4/1953 | Berhoudar | 137/556 |
| 2,812,776 | 11/1957 | Lofftus et al. | 251/129 |
| 3,367,365 | 2/1968 | Stevens | 137/554 |
| 3,420,494 | 1/1969 | Egner | 251/130 |
| 3,620,185 | 11/1971 | Keller et al. | 116/277 |
| 3,621,873 | 11/1971 | Kenann et al. | 137/554 |
| 3,923,475 | 12/1975 | Stenzel | 137/554 |
| 4,027,849 | 6/1977 | Muller | 251/138 |

FOREIGN PATENT DOCUMENTS

1223383  2/1971  United Kingdom ..................... 137/554

Primary Examiner—William R. Cline
Assistant Examiner—H. Jay Spiegel
Attorney, Agent, or Firm—Edwin E. Greigg

[57] ABSTRACT

An electromagnetic valve is equipped with a signal generator which operates in dependence on the positions assumed by the internal valve mechanism and which represents a relatively small unit which is attached in various positions to the housing of the magnetic actuator mechanism of the valve. The signal generator has at least one electrical switch which is actuated mechanically by a pin which transmits the motions of the armature to the switch without any appreciable interference with the operation of the magnetic mechanism. The switch is mounted within a housing on an insert which may be located in various positions relative to the housing and may suitably be a microswitch. The signal generator housing is sealingly attached to a mounting bracket which, in turn, is mounted on the housing of the magnetic actuator of the valve. The passage of the actuating pin is sealed against the outside by appropriate seals. The signal generator housing may include a transparent, possibly colored window or lens behind which is disposed a lamp which is actuated by the switch. The lamp and its load resistor are held in appropriate recesses of the switch insert, the position of which relative to the mounting bracket is secured by a guide pin.

4 Claims, 7 Drawing Figures

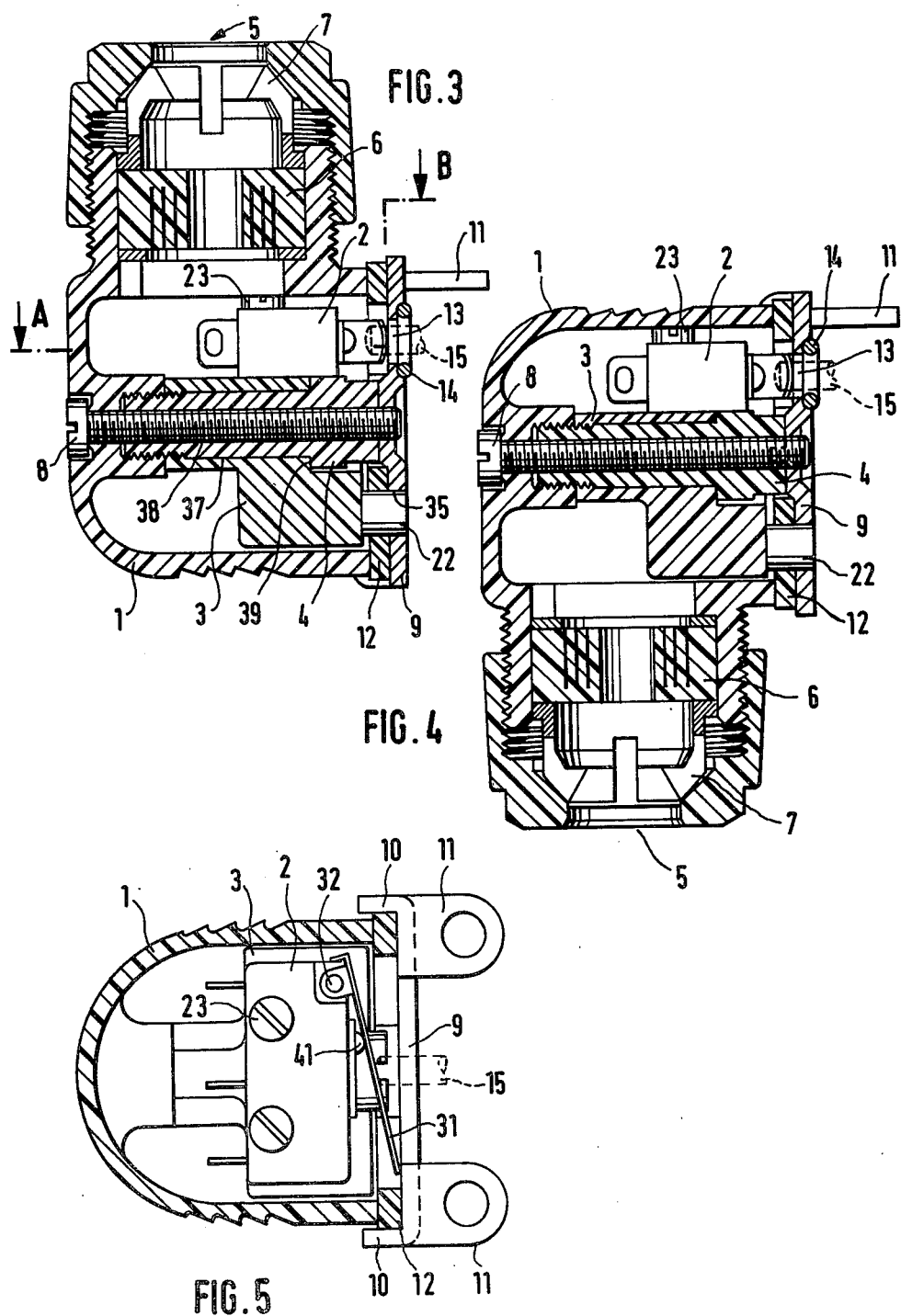

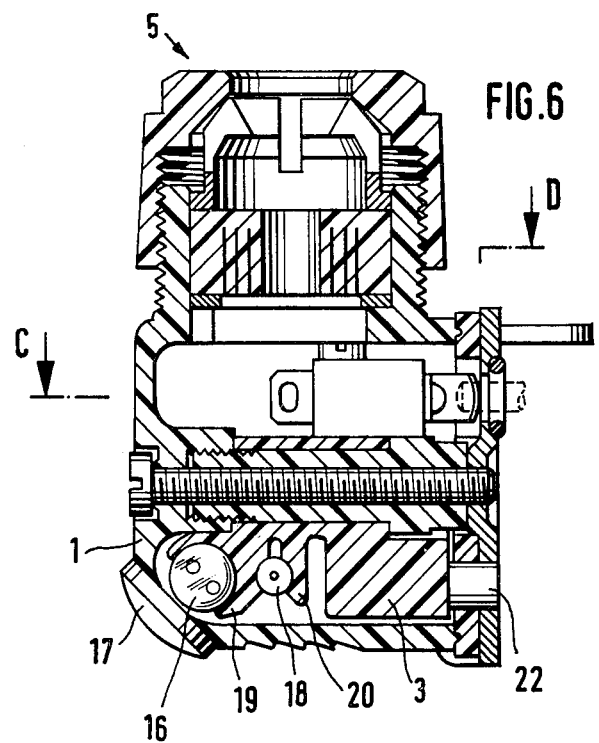
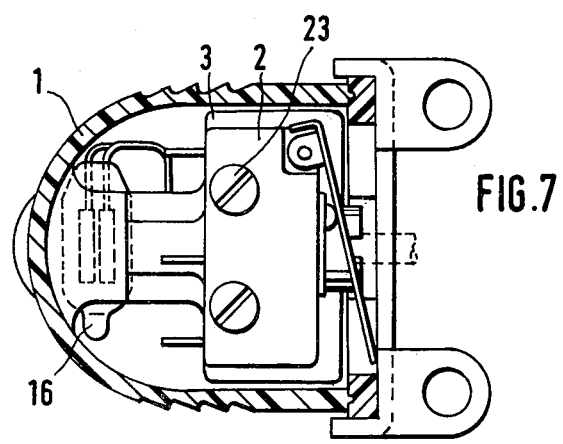

ELECTROMAGNETIC VALVE WITH ELECTRIC SIGNAL GENERATOR

BACKGROUND OF THE INVENTION

The invention relates to auxiliary equipment for electromagnetic or solenoid valves including an electrical signal generator which operates in dependence on the various positions of the valve closing element. The valve closing element in magnetic valves used for liquid or gaseous flowing media is usually actuated by a movable magnetic armature. The armature may be located pivotably, a so-called flap armature, or may be movable in the axial direction. In both cases, the magnetic armature is returned from its extended position to its normal position by a return spring whenever the current in the coil is terminated. In known magnetic valves of this type, the magnetic actuator is a single unit within a housing which is attached in a suitable manner to the valve housing. The electric signal generator which operates in dependence on the position of the valve closing element and thus in dependence on the position of the magnetic armature may be used for signaling the position of the valve closing member in a variety of ways, in particular by switching an optical indicator and/or by triggering other processes, and especially further control processes.

DESCRIPTION OF THE PRIOR ART

A magnetic actuator device for magnetic valves with a flap armature is known for example from U.S. Pat. No. 3,420,494 (Egner). A magnetic actuator of this type is also known from the German Offenlegungsschrift No. 24 26 748. The latter document also illustrates the basic configuration of the valve and the coupling between the magnetic drive and the valve. From his own knowledge, Applicant regards it as known to indicate the final positions of the valve closing member which correspond to the final positions of the magnetic armature in some manner to the exterior of the unit. Such indications have heretofore been possible only with a large number of levers, joints and other transmission elements and were correspondingly expensive. It is also known to use the indications to initiate further control steps, yet the means previously used for such transmission of information such as actuating rods, adjustable switching cams, multi-partite housings, etc., were also expensive and required condiserable space.

Further known are electrical switches of small size, sometimes called microswitches. Known also is a standardized housing according to German normalization specification DIN 43 650 for apparatus plugs which is used within the invention for a purpose other than that normally envisioned.

Finally, axially operating armatures of magnetic valves have been known in the art in many versions.

OBJECTS AND SUMMARY OF THE INVENTION

It is a principal object of the invention to provide a magnetically operated valve with an electrically operating indicator that permits indications of the operating positions of the valve closing member and of the magnetic actuator and which is simple, inexpensive and of small size and may be used for a variety of different magnetic valve actuating mechanisms.

It is another object of the present invention to provide a magnetic valve and an electric signal transducer which are coupled in a simple manner which requires no substantial alterations of the construction of the magnetic actuating mechanism.

Yet another object of the invention is to make the coupling between the magnetic actuator and the signal transducer so as to be immune to outside disturbances.

These and other objects are attained, according to the invention, by providing a magnetically operated valve having a signal generator which includes a switch that has a spring loaded actuating element and wherein the transmission of motion from the movable magnetic armature to the switch is performed by a mechanically displaced actuating pin. Another feature of the invention provides that the electric signal generator, including the switch, is located in a single housing which can be easily attached to the housing of the magnetic drive mechanism, thereby forming a single unit.

In a particular embodiment of the invention in which the magnetic armature is pivotably mounted (flap armature), one end of the actuating pin is enlarged, and is placed between a surface of the armature and one end of the return spring for the armature, whereas the other end of the actuating pin is passed through an opening in the housing of the magnetic actuator and enters an opening in the signal generator housing where it makes contact with the actuating element of the electric switch. The motion of the armature is thus coupled to the switch without any rigid connections and without any joints.

In another embodiment of the invention in which the magnetic drive mechanism has an armature that executes rectilinear motions, i.e., an axial armature, the actuating pin for the switch is located in a hollow space of the armature which also contains the return spring and passes through the center of the return spring. The enlarged portion of the actuating pin is supported by the bottom of the hollow space within the armature.

The entire construction is considerably simplified and made less expensive by embodying the signal transducer so as to fit a standardized housing according to German DIN 43 650, which is intended to be used for electrical plugs in a variety of apparatus. In a particular embodiment of the invention, there is provided within the signal generator housing an optical indicator mechanism which includes a transparent, if necessary, colored window or lens within the housing and further includes an incandescent lamp with a load resistor suitably powered and actuated by the switch.

The invention will be better understood as well as further objects and advantages thereof become more apparent from the ensuing detailed description of several embodiments taken in conjunction with the drawing.

BRIEF DESCRIPTION OF THE DRAWING

FIG. 3 is a longitudinal section through the signal generator of FIG. 1;

FIG. 4 is a section through an embodiment of a signal generator in which the elements are disposed in a different manner than is the case in FIG. 3;

FIG. 5 is a section through the line A–B in FIG. 3;

FIG. 6 is an embodiment similar to that of FIG. 3 but containing optical indicator means; and FIG. 7 is a section through line C–D in FIG. 6.

DESCRIPTION OF THE PREFERRED EMBODIMENTS

Figure 1:
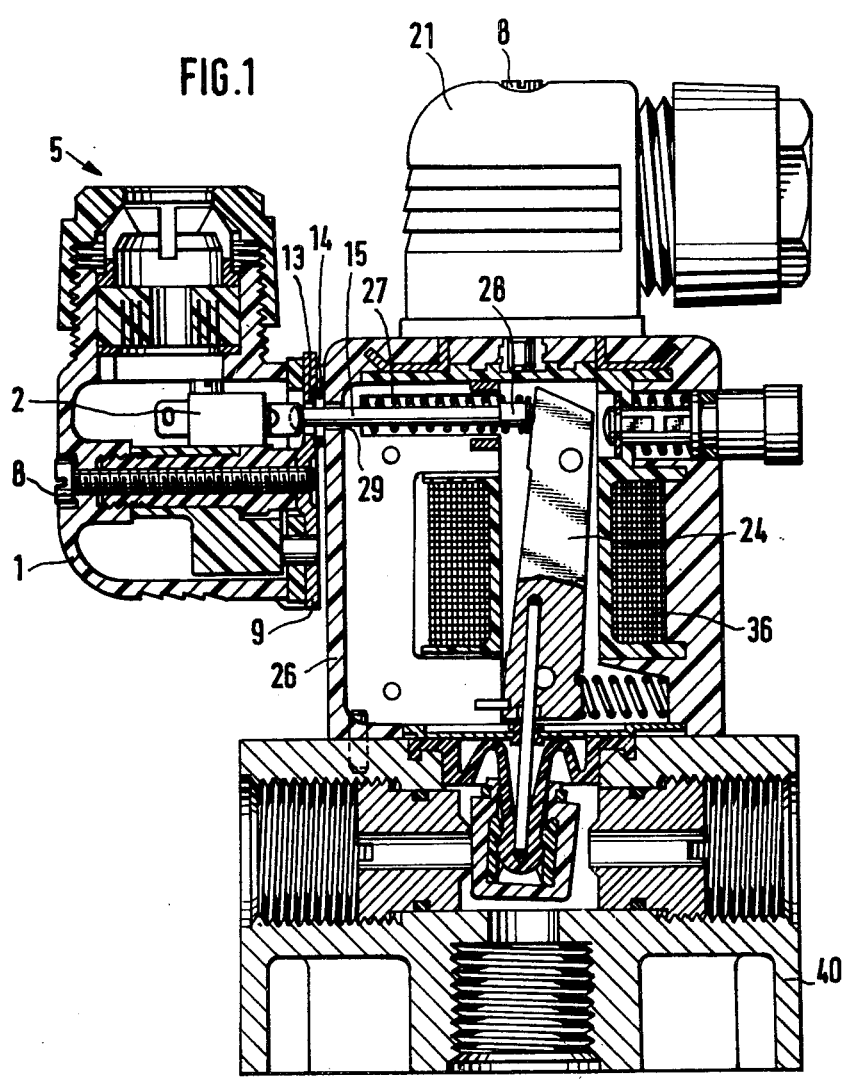
FIG. 1 is a longitudinal section through a 3/2-way flap armature magnetic valve including a signal transducer, according to the invention.

In all the embodiments to be described, the housing 1 of the electrical signal generator is a standardized housing intended generally to be an electrical plug for various types of apparatus and constructed according to the specifications of the German Industrial Standardization No. 43 650. Such an electrical plug is also used for the plug 21 which is shown in both exemplary embodiments, according to FIGS. 1 and 2, and provides the main power for the magnetic coils 36. The signal generator housing 1 includes an electric switch 2, suitably embodied as a microswitch. The switch 2 is fastened on a special switch insert 3 by means of cylindrical screw 23. The insert 3 is suitably made of electrically insulating plastic. As will be seen especially clearly from FIG. 3, the insert 3 is held in the housing 1 on a cylindrical region 37 of a hollow mounting screw 4. The mounting screw 4 is fastened within the housing 1 by means of threads 38. The end of the hollow mounting screw 4 remote from its threads exhibits a shoulder 39 which is pressed against a corresponding recess in the insert 3. It will be appreciated that the insert 3 can be rotated on the screw 4 to occupy various angular positions, as will be seen from comparing, for example, FIGS. 1 and 2 or FIGS. 3 and 4. In particular, the insert 3 and the switch 2 can be positioned in four different positions, relatively displaced by 90° from one another, and chosen to correspond to the position of the cable outlet 5. The latter is provided with a sealing box 6 and also includes a strain relief clamp 7.

The bottom of the signal generator housing 1 is closed off by a bracket 9 which is attached to the housing by a single screw 8, thereby pressing a flat seal 12 between the housing and the bracket. The bracket 9 is provided with side rails 10 which partially envelop the housing and prevent its rotation. The bracket further includes fastening tabs 11. The bracket 9 is so adapted to the housing 26 of any particular magnetic actuating mechanism that, after installation of the signal generator housing on the magnetic drive housing, these two elements may then be fastened on the valve housing 40 without requiring any additional fastening means or screws. The signal generator housing 1 is attached to the housing 26 of the magnetic drive mechanism by means of screws which pass through holes in the tabs 11.

The switch insert 3 is suitably provided with a single locating pin 22 which engages an opening 35 within the bracket 9 and thus defines the correct position of the insert 3 with respect to the bracket 9. The motions of the movable armature 24 of FIG. 1 (and armature 25 of FIG. 2) is transmitted to the switch 2 by a mechanically displaced actuating pin 15. The passage of this pin 15 through the bracket 9 is made possible by an opening 13. The opening 13 is sealed with respect to the outside by a seal 14 which is embodied as a O-ring in FIG. 1 and as a flat seal in FIG. 2.

In the example illustrated in FIG. 1, the pin 15 has an enlarged portion 28 which is disposed between a face of the armature 24 and one end of its return spring 27. The opposite end of the actuating pin passes through an opening 29 in the housing 26 and further through the opening 13 in the signal generator housing 1 and engages the switching member 31 attached to the electrical switch 2. In the exemplary embodiments exhibited, the switching member 31 is a lever which pivots about a shaft 32 and engages a push-button 41.

Figure 2:
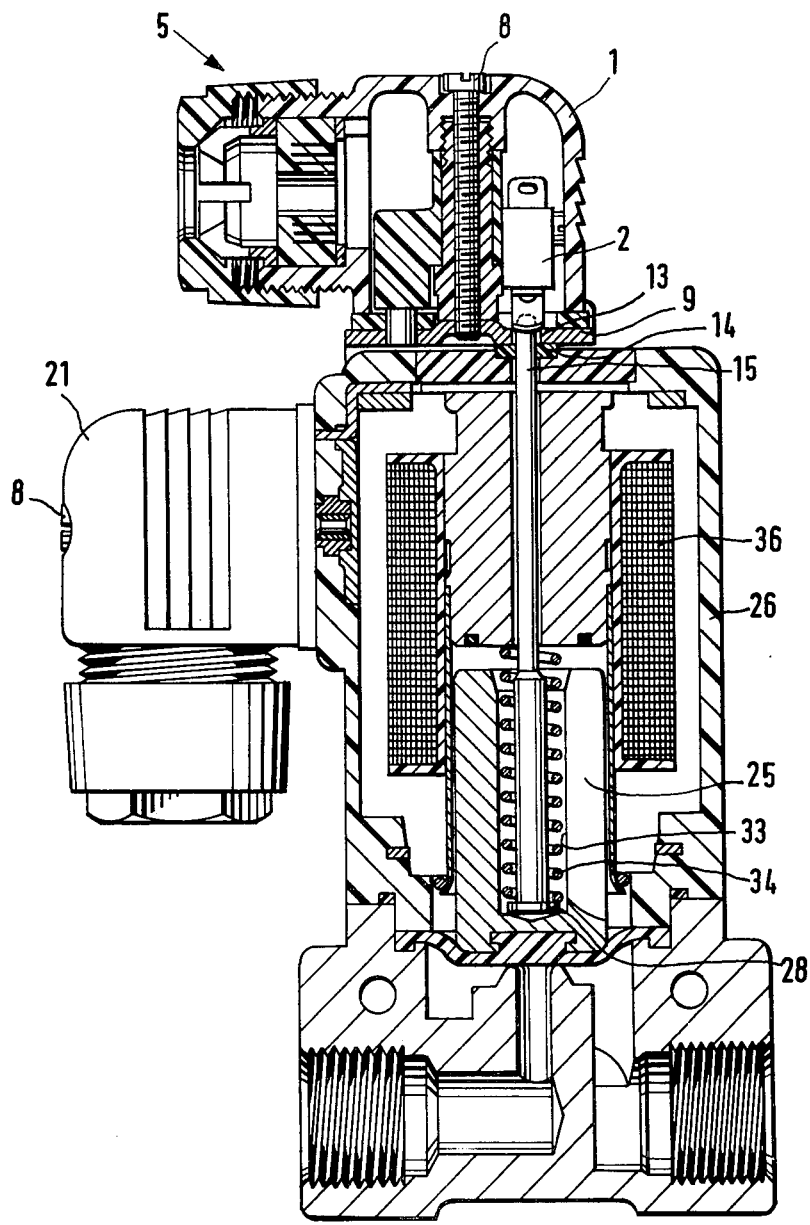
FIG. 2 is a longitudinal section through a 2/2-way axial armature magnetic valve including an electrical signal transducer, according to the invention, located in a different part of the magnetic actuating mechanism than is the case in FIG. 1.

In the exemplary embodiment of FIG. 2, the actuating pin 15 is located in an axial bore 33 of the armature 25 and also passes through the return spring 34 located in the bore. An enlarged portion 28 of the pin is in contact with the base of the bore 33. The opposite end of the pin 15 operates in the manner already described with respect to FIG. 1 by cooperation with the lever 31 of the switch 2.

Yet another exemplary embodiment of the invention, illustrated in FIGS. 6 and 7, includes an optical indicator mounted within the housing 1 and including a transparent and possibly colored lens or window 17. Located behind the window 17 is a lamp 16, possibly including a load resistor 18. The lamp 16 is powered in suitable manner by means of the switch 2. The lamp 16 and the resistor 18 may both be held in suitable recesses 19, 20 which are formed in or are a part of the switch insert 3.

The foregoing relates to preferred exemplary embodiments of the invention, it being understood that other embodiments and variants are possible within the spirit and scope of the invention, the latter being defined by the appended claims.

What is claimed is:

1. In an electromagnetic valve assembly which includes a valve mechanism and a valve housing, an electromagnetic actuating mechanism for actuating a movable closure member of said valve mechanism, said electromagnetic actuating mechanism including an armature movable between two terminal positions and urged in one terminal position by a return spring and being contained in a magnet housing, said assembly further including signal generator means for providing signals indicative of the positions of said movable closure member and of said armature, the improvement comprising:

said signal generator means includes a microswitch having a switch-closing member the closure motion of which is resisted by elastic means and a removable insert on which said microswitch is affixed;

a unitary housing having an interior in which said signal generator means is disposed having an opening, means for detachably mounting said unitary housing on said magnet housing in one of a plurality of selected positions;

means for mounting said insert in a plurality of selected annular positions within said unitary housing; and there is disposed in said magnet housing a movable pin which mechanically transmits motions of said armature through said unitary housing opening to said switch-closing member in said unitary housing mounted on said magnet housing; said means for mounting said unitary housing on said magnet housing including a bracket having an opening and a sealing member disposed adjacent said opening and means on said bracket for mounting said bracket on said unitary housing and said magnet housing with said openings in said housings in aligned relationship for accommodating said pin therethrough.

2. An electromagnetic valve assembly as defined by claim 1 wherein said bracket has guide rails for preventing the rotational motion of said signal generator housing and is further provided with attachment tabs.

3. An electromagnetic valve assembly as defined by claim 1 wherein said insert is provided with a locating pin for engaging an associated opening in said bracket to thereby position said insert with respect to said bracket.

4. An electromagnetic valve assembly as defined by claim 1 wherein said bracket has an opening through which passes said movable pin and wherein there is further provided a seal surrounding said opening, said seal being clamped between said bracket and said magnet housing.

* * * * *